H. A. ALDRED.
COLLAR SUPPORTER.
APPLICATION FILED NOV. 18, 1908.
928,621.
Patented July 20, 1909.
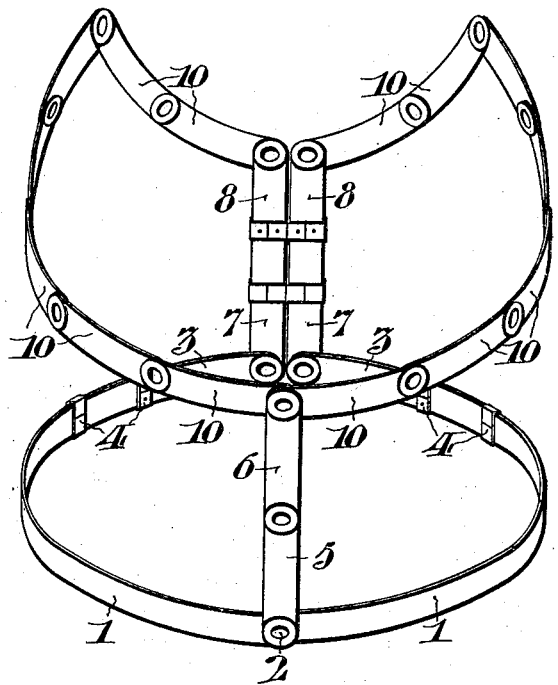
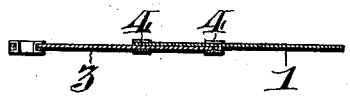
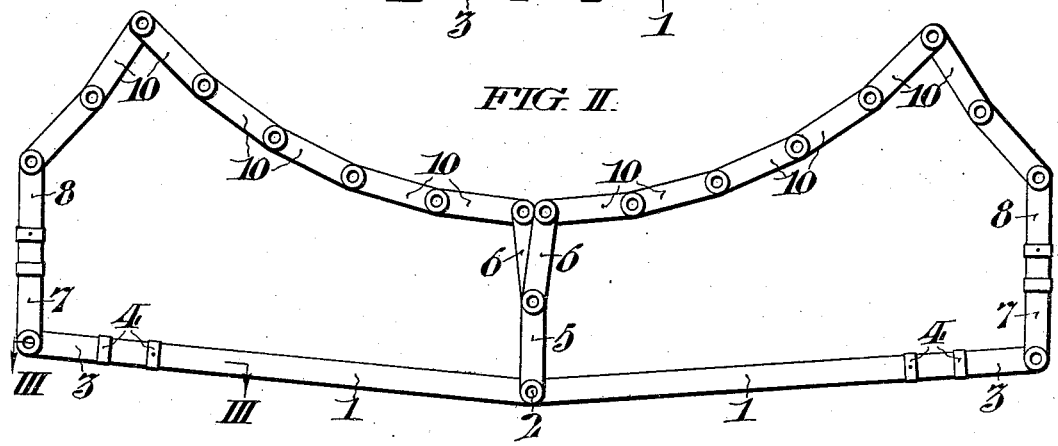
WITNESSES:
INVENTOR:
HORACE A. ALDRED,
by his attorneys

UNITED STATES PATENT OFFICE.

HORACE A. ALDRED, OF PHILADELPHIA, PENNSYLVANIA.

COLLAR-SUPPORTER.

No. 928,621.  Specification of Letters Patent.  Patented July 20, 1909.

Application filed November 18, 1908. Serial No. 463,152.

*To all whom it may concern:*

Be it known that I, HORACE A. ALDRED, of Philadelphia, in the county of Philadelphia and State of Pennsylvania, have invented certain new and useful Improvements in Collar-Supporters, whereof the following is a specification, reference being had to the accompanying drawings.

My invention relates to a collar supporter adapted to be attached to or incorporated within a lady's collar, so as to support the otherwise limp material thereof, and to determine its configuration.

My collar supporter is extensible, and therefore adaptable to the size of the neck of the wearer, and the outline of its upper edge is capable of being varied or adjusted to suit the taste of the wearer.

In the accompanying drawings, Figure I, represents a collar supporter embodying my invention, shown in perspective as adapted to encircle the neck. Fig. II, shows the same collar supporter extended. Fig. III, is a partial section along the line III, III, of Fig. II.

My collar supporter is made of strips of whalebone, or celluloid, or other suitable light and inconspicuous material joined and articulated so as to be capable of being made to conform to any neck or desired configuration.

The base of the supporter comprises two strips 1, 1, pivotally united at 2, and both provided with sliding extensions 3, 3. The pivot 2, is preferably an eyelet passing through the overlapping ends of the strips 1, 1. The extensions 3, 3, are maintained in proper sliding alinement with the parts 1, 1, by the bands 4, 4, attached one to the part 1, and the other to the part 3. To the base thus formed, a suitable number of uprights are attached. In the present instance I have shown three, but, if desired, a greater number of such uprights suitably spaced may be employed. As shown, the central upright consists of a single member 5 and the two members 6, 6, in which case variation in the height of the upright can be secured by opening the members 6, 6, the greatest height being secured when they are in precise alinement as shown in Fig. I.

The two terminal uprights 7, 7, are provided with extension pieces 8, 8, with a sliding joint between the two similar to those employed in the base strips.

The upper edge of the collar stay consists of a series of comparatively short strips 10, 10, each of which is united to the adjoining strips by a pivotal joint, preferably in the form of an eyelet, the joints being sufficiently firm to permit the shaping of its edge according to the taste of the wearer or the prevailing style.

I prefer to make the pivoted joints of my collar supporter by means of eyelets as described, not only because it is an economical form of construction, but because the central apertures of the eyelets may be utilized in sewing a collar to the stay.

My collar stay is capable of much variation and adaptation without departing from the plan of construction thus described, of which the important points are the eyelet joints, the articulated upper edge with its capacity of change of configuration, the vertically extensible uprights, and the laterally extensible base. It will be also noted that the stay is completely reversible.

Having thus described my invention, I claim:—

1. A collar stay comprising a suitable base and an articulated upper edge composed of short sections united by pivotal joints.

2. A collar stay comprising a base, an articulated upper edge, composed of short sections united by pivoted joints and extensible uprights uniting the base to the upper edge.

3. A collar stay comprising a laterally extensible base piece in combination with uprights, and an articulated upper edge composed of short sections united by pivotal joints.

4. In a collar supporter, the combination of the laterally extensible base; a pivotally bifurcated front upright; two extensible terminal uprights; and an articulated upper edge uniting the uprights, substantially as described.

5. A collar stay comprising an upper edge member, uprights at the ends of the stay pivotally connected to the upper edge member, a base formed of flat strips pivoted at one end to the uprights, and at their other ends to each other, a strip for connecting the pivotally attached ends to the upper edge.

In testimony whereof, I have hereunto signed my name, at Philadelphia, Pennsylvania, this seventeenth day of November 1908.

HORACE A. ALDRED.

Witnesses:
ALFRED M. MOHR,
E. L. FULLERTON.